(12) United States Patent
Kunii et al.

(10) Patent No.: US 10,222,983 B2
(45) Date of Patent: Mar. 5, 2019

(54) STORAGE MANAGEMENT COMPUTER AND MANAGEMENT METHOD OF STORAGE APPARATUS

(71) Applicant: HITACHI, LTD., Tokyo (JP)

(72) Inventors: Masashi Kunii, Tokyo (JP); Masataka Nagura, Tokyo (JP); Hironori Emaru, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/554,394

(22) PCT Filed: Jun. 10, 2015

(86) PCT No.: PCT/JP2015/066650
§ 371 (c)(1),
(2) Date: Aug. 29, 2017

(87) PCT Pub. No.: WO2016/199232
PCT Pub. Date: Dec. 15, 2016

(65) Prior Publication Data
US 2018/0059946 A1    Mar. 1, 2018

(51) Int. Cl.
*G06F 3/06* (2006.01)
*G06F 11/14* (2006.01)

(52) U.S. Cl.
CPC .......... *G06F 3/0604* (2013.01); *G06F 3/0605* (2013.01); *G06F 3/067* (2013.01); *G06F 3/0631* (2013.01); *G06F 3/0647* (2013.01); *G06F 3/0653* (2013.01); *G06F 3/0665* (2013.01); *G06F 11/1446* (2013.01); *G06F 3/065* (2013.01)

(58) Field of Classification Search
None
See application file for complete search history.

(56) References Cited

U.S. PATENT DOCUMENTS

2013/0054889 A1    2/2013    Vaghani et al.

OTHER PUBLICATIONS

International Search Report and Written Opinion for PCT App No. PCT/JP2015/066650 dated Sep. 1, 2015, 8 pgs.

*Primary Examiner* — Kevin Verbrugge
(74) *Attorney, Agent, or Firm* — Procopio, Cory, Hargreaves & Savitch LLP

(57) ABSTRACT

A management computer stores, in a memory, configuration information which indicates, by mapping, a virtual volume recognized by a host computer and a logical volume provided by a storage apparatus, and backup history information which manages a data backup history on a per virtual volume basis. Upon receiving a data backup request designating a virtual volume, the CPU of the management computer refers to the configuration information and acquires information of the logical volume mapped with the designated virtual volume. The CPU additionally refers to the backup history information and determines whether the logical volume currently mapped with the virtual volume coincides with the logical volume associated with the stored history. When it is determined that the mapped logical volume differs from the logical volume associated with the stored history, the CPU performs control to implement a differential backup between the logical volumes.

10 Claims, 17 Drawing Sheets

| 36 | 360 | 361 | 362 | 363 | 364 | 365 |
|---|---|---|---|---|---|---|
| Profile ID | Media Type | Media Rotation Speed | Snapshot | Replication | Provisioning |
| 100 | SATA | 7200rpm | False | Local | Thick |
| 101 | SATA | 7200rpm | False | Remote | Thick |
| 102 | SAS | 15000rpm | True | Remote | Thin |
| 200 | SAS | 15000rpm | True | Local | Thin |
| 300 | SAS | 15000rpm | True | Remote | Thick |
| 301 | SSD | null | True | Remote | Thin |

Fig.3

| 37 | 370 | 371 | 372 |
|---|---|---|---|
| Virtual Volume ID | Profile ID | Time Stamp |
| VVOL1 | 100 | 2014/12/10 10:00:00 |
|  | 101 | 2014/12/12 10:00:00 |
|  | 102 | 2014/12/14 10:00:00 |
| VVOL2 | 200 | 2014/12/12 10:00:00 |
| VVOL3 | 300 | 2014/12/12 10:00:00 |
|  | 301 | 2014/12/14 10:00:00 |

Fig.4

| 39 | 390 | 391 | 392 | 393 | 394 |
|---|---|---|---|---|---|
| Virtual Volume ID | Storage Apparatus ID | Logical Volume ID | Profile ID | Volume Capacity | |
| VVOL1 | Storage2 | Vol20 | 102 | 150GB | |
| VVOL2 | Storage2 | Vol21 | 200 | 300GB | |
| VVOL3 | Storage3 | Vol30 | 301 | 800GB | |

Fig.5

| 70 | 700 | 701 | 702 | 703 | 704 | 705 | 706 | 707 |
|---|---|---|---|---|---|---|---|---|
| Storage Apparatus ID | Logical Volume ID | Media Type | Media Rotation Speed | Snap -shot | Repli -cation | Provis -ioning | Capacity | |
| Storage1 | Vol10 | SATA | 7200 rpm | True | Local | Thick | 150 GB | |
| | null | SATA | 7200 rpm | True | Local | - | 1.85 TB | |
| | null | SAS | 15000 rpm | False | Local, Remote | - | 3TB | |
| Storage2 | Vol20 | SAS | 15000 rpm | True | Local, Remote | Thick, Thin | 150 GB | |
| | Vol21 | SAS | 15000 rpm | True | Local, Remote | Thick, Thin | 300 GB | |
| | Vol22 | SAS | 15000 rpm | True | Local, Remote | Thick, Thin | 500 GB | |
| Storage3 | Vol30 | SSD | null | True | Local, Remote | Thick, Thin | 800 GB | |
| | Vol31 | SSD | Null | True | Local, Remote | Thick, Thin | 200 GB | |
| | null | SAS | 15000 rpm | True | Local, Remote | - | 2TB | |

Fig.6

| Backup Apparatus ID (740) | Backup ID (741) | Backup Type (742) | Virtual Volume ID (743) | Logical Volume ID (744) | Storage Apparatus ID (745) | Time Stamp (746) | Profile ID (747) | Volume Capacity (748) |
|---|---|---|---|---|---|---|---|---|
| TapeDrive1 | Vol10-201412111000000 | Full | VVOL1 | Vol10 | Storage1 | 2014/12/11 10:00:00 | 100 | 100GB |
| | Vol10-201412131000000 | Difference | | | | 2014/12/13 10:00:00 | 101 | 150GB |
| | Vol20-201412151000000 | Difference | | Vol20 | Storage2 | 2014/12/15 10:00:00 | 102 | 150GB |
| TapeDrive2 | Vol21-201412131000000 | Full | VVOL2 | Vol21 | | 2014/12/13 10:00:00 | 200 | 300GB |
| | Vol21-201412151000000 | Difference | | | | 2014/12/15 10:00:00 | 201 | 300GB |
| | Vol22-201412131000000 | Full | VVOL3 | Vol22 | | 2014/12/13 10:00:00 | 300 | 500GB |
| | Vol30-201412151000000 | Difference | | Vol30 | Storage3 | 2014/12/15 10:00:00 | 301 | 800GB |

MESSAGE:
BACKUP OF "VVOL1" AT "2014/12/15 10:00:00" WILL BE RESTORED. WHICH PROFILE SHOULD BE APPLIED FOR RESTORATION? PLEASE SELECT PROFILE FROM BELOW AND THEN PRESS "ENTER" BUTTON.

⦿ SELECT AMONG PROFILES PREVIOUSLY APPLIED TO "VVOL1"

|   | Profile ID | Media Type | Media Rotation Speed | Snap-shot | Repli-cation | Provisi-oning | Time Stamp |
|---|---|---|---|---|---|---|---|
| ☐ | 100 | SATA | 7200 rpm | False | Local | Thick | 2014/12/10 10:00:00 |
| ☐ | 101 | SATA | 7200 rpm | False | Remote | Thick | 2014/12/12 10:00:00 |
| ☑ | 102 | SAS | 15000 rpm | False | Remote | Thick | 2014/12/14 10:00:00 |

○ SELECT PROFILE FROM OTHER THAN THOSE INDICATED ABOVE

|   | Profile ID | Media Type | Media Rotation Speed | Snapshot | Replication | Provision-ing |
|---|---|---|---|---|---|---|
| ☐ | 300 | SAS | 15000rpm | True | Remote | Thick |
| ☐ | 200 | SAS | 15000rpm | True | Remote | Thin |
| ☐ | 301 | SSD | null | True | Remote | Thin |

○ CREATE NEW PROFILE

[ CANCEL ]  [ ENTER ]

Fig.10

| 82 | 820 | 821 | 822 | 823 |
|---|---|---|---|---|
| | Virtual Host ID | Virtual I/F Count | Virtual Volume ID | Running Application |
| | VM1 | 3 | VVOL1 | web server |
| | VM2 | 3 | VVOL2 | db server |
| | VM3 | 2 | VVOL3 | mail server |

Fig.14

| 83 | 830 | 831 | 832 |
|---|---|---|---|
| | Physical Host ID | Physical I/F Count | Virtual Host ID |
| | HV1 | 3 | VM1 |
| | | | VM2 |
| | HV2 | 2 | VM3 |

Fig.15

| 84 | 840 | 841 |
|---|---|---|
| | Storage Apparatus ID | Physical Host ID |
| | Storage1 | HV1 |
| | Storage2 | |
| | Storage3 | HV2 |

| General Rule ID: 1 | | 872 | 873 | 874 |
|---|---|---|---|---|
| | | Device Part | Device | Condition |
| Condition Part | 1 | Volume | VM | Used |
| | 2 | WebServer | VM | Runnning |
| Applied Restriction Template ID | A | | | |

871 → Condition Part row
875 → Applied Restriction Template ID row

| Restriction Template ID: A | | 882 | 883 | 884 |
|---|---|---|---|---|
| | | Acquisition Metrics | Target Device | Acquisition Timing |
| Variable | 1 | I/F count | VM | Backup |
| | 2 | I/F count | Connection Destination Physical host | Restoration |
| Restriction | Variable 2 is greater than variable 1 | | | |

881 → Variable row
885 → Restriction row

Restoration Restriction ID: A-1

| # | Metrics | Target Device | Restriction Type | Value |
|---|---|---|---|---|
| | 891 | 892 | 893 | 894 |
| 1 | I/F count | Connection Destination Physical host | Minimum Value | 3 |

Fig.19

STORAGE MANAGEMENT COMPUTER AND MANAGEMENT METHOD OF STORAGE APPARATUS

CROSS-REFERENCE TO RELATED APPLICATIONS

This application is a U.S. National Stage entry of PCT Application No. PCT/JP2015/066650, filed on Jun. 10, 2015, the contents of which are incorporated herein by reference.

TECHNICAL FIELD

The present invention relates to a backup management technology of a virtualized computer system.

BACKGROUND ART

The virtualization technology of computer systems is being developed for improving the usage efficiency and flexibility of system resources.

PTL 1 describes a technology of designating a performance profile and assigning a virtual volume, which is provided by a storage apparatus, to a VM (Virtual Machine).

CITATION LIST

Patent Literature

PTL 1: Specification of US Patent Application No. 2013/0054889

SUMMARY OF THE INVENTION

Problems to be Solved by the Invention

In order to provide a virtual volume to a VM, from the perspective of storage management, a logical volume configured in a storage area of a storage apparatus is assigned to the virtual volume. When the performance profile or the like requested by the VM is changed, the assignment of the virtual volume to be provided to the VM is switched to a logical volume that satisfies the requested performance profile, and data used by the VM is transferred between the logical volumes.

As described above, while the storage resource is used as a virtual volume on the one hand, with regard to the stored data, the logical volume is subject to backup management on the other hand. Because the device that performs the backup management does not manage virtual volumes, the device is unable to recognize the assignment of the logical volume to the virtual volume. Thus, even when the data used by the VM is transferred between the logical volumes, the logical volume before and after the change of assignment is recognized as different management targets, and the backup management of data cannot be succeeded.

For instance, even in cases where a user wishes to use a backup technology such as a differential backup, which yields superior capacity efficiency, there is a problem in that the differential backup cannot be used when there is a change to the assignment of the logical volume to the virtual volume.

An object of the present invention is to efficiently perform backup management of virtualized computer systems.

Means to Solve the Problems

In order to achieve the foregoing object, the management computer provided by one embodiment of the present invention stores, in a memory, configuration information which indicates, by mapping, a virtual volume recognized by a host computer and a logical volume provided by a storage apparatus, and backup history information which stores, by associating, a data backup history with a virtual volume and a logical volume. Upon receiving a data backup request designating the virtual volume, a CPU of the management computer refers to the configuration information and acquires information of the logical volume mapped to the designated virtual volume, additionally refers to the backup history information and determines whether the mapped logical volume coincides with the logical volume associated with the stored backup history, and, when the mapped logical volume differs from the logical volume associated with the stored backup history as a result of the determination, performs control to implement a differential backup between the logical volumes.

Advantageous Effects of the Invention

According to one embodiment of the present invention, it is possible to improve the efficiency of backup management of virtualized computer systems.

BRIEF DESCRIPTION OF DRAWINGS

FIG. 3 shows the profile definition table.
FIG. 4 shows the profile history table.
FIG. 5 shows the volume configuration table.
FIG. 6 shows the storage configuration table.
FIG. 8 shows the backup history table according to the first embodiment.
FIG. 10 shows a selection screen example of the profile to be applied when performing the restoration.
FIG. 14 shows the virtual host configuration table according to the second embodiment.
FIG. 15 shows the server configuration table according to the second embodiment.
FIG. 16 shows the topology configuration table according to the second embodiment.
FIG. 17 shows an example of the general rules according to the second embodiment.
FIG. 18 shows an example of the restriction template according to the second embodiment.
FIG. 19 shows an example of the restoration restriction according to the second embodiment.

DESCRIPTION OF EMBODIMENTS

Embodiment 1

Figure 1:
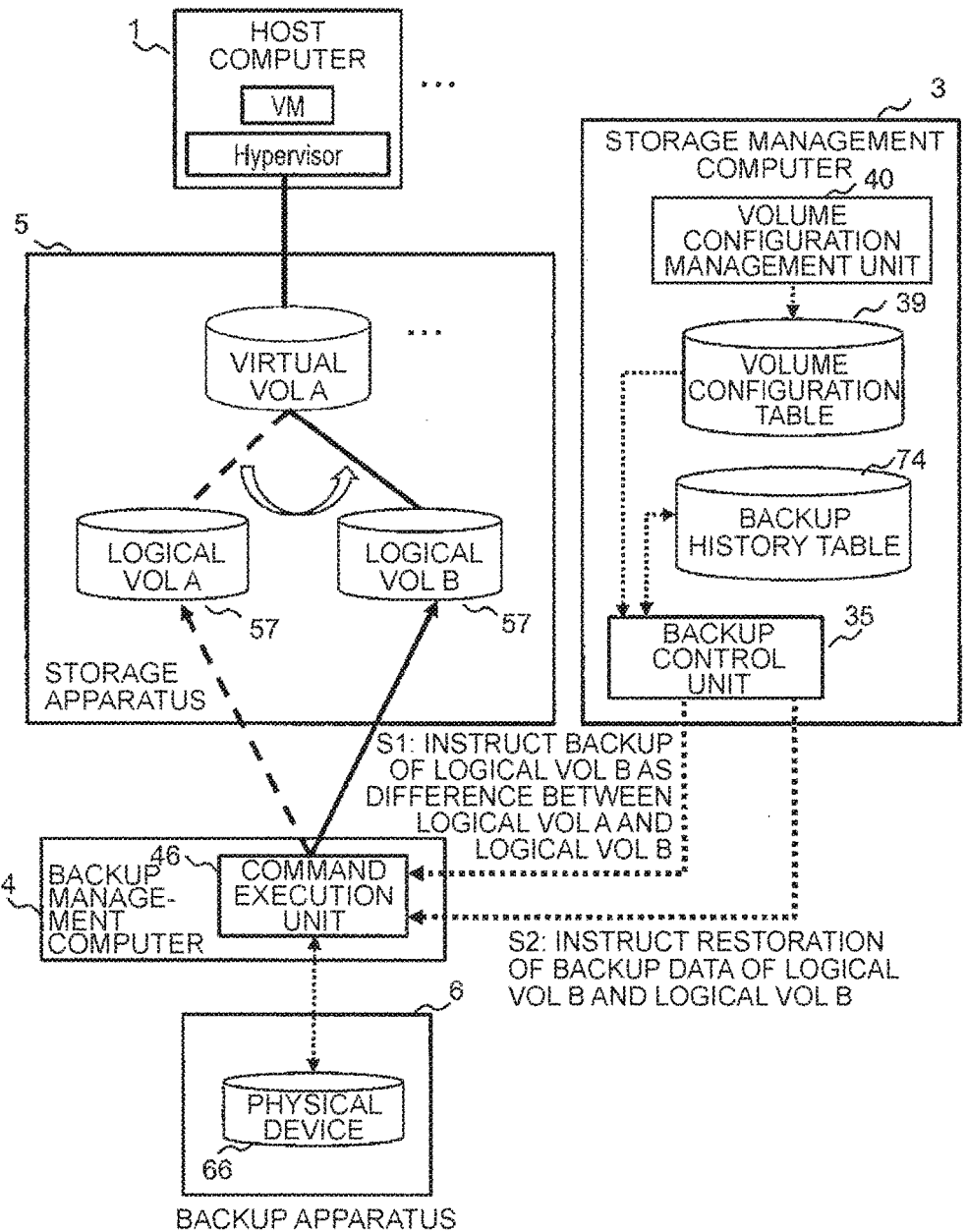
FIG. 1 shows the overview of the first embodiment.

FIG. 1 is a diagram showing the overview of the first embodiment.

The computer system of this embodiment includes a host computer 1, a storage management computer 3, a backup management computer 4, a storage apparatus 5, and a backup apparatus 6.

The host computer 1 includes a general virtualization mechanism such as a Hypervisor, and operates an object as typified by a VM. The object is stored in a storage area of the storage apparatus. The storage area of the storage apparatus used by the host computer 1 is assigned to the object as a virtual volume to be recognized by the host computer 1.

The virtual volume, as a result of being mapped to a logical volume 57, provides a storage area to the host computer 1. The mapping of the virtual volume and the logical volume is managed with a volume configuration table 39.

Moreover, the volume configuration table 39 additionally manages information of a profile which is set to the virtual volume and in which the required performance value and resource capacity are defined. A volume configuration management unit 40 has a function of mapping the logical volume to the virtual volume based on the profile. When the profile is changed, the mapping of the logical volume is changed as needed so that the new profile (profile after the change) is satisfied, and data is thereby transferred. Based on this function, the actual data storage destination can be switched to a different logical volume while causing the host computer 1 to continue recognizing the virtual volume to be the same virtual volume.

In FIG. 1, foremost, let it be assumed that a virtual volume A has been mapped to a logical volume A.

The storage management computer 3 receives a backup request designating the virtual volume A. The backup control unit 35 refers to the volume configuration table 39 and instructs a command execution unit 46 of the backup management computer 4 to execute the backup of the logical volume A corresponding to the virtual volume A. If it is the first backup of the virtual volume A, a full backup is created, and a differential backup is created for the second backup onward. The command execution unit 46 stores the backup of the logical volume 1 in a physical device 66 of the backup apparatus 6 as instructed. The backup control unit 35 registers, in a backup history table 74, information related to the virtual volume and logical volume to be backed up, and the set profile.

Here, let it be assumed that the contents of the profile of the virtual volume A have been changed, and the logical volume to be mapped to the virtual volume A has been switched so that the new profile (profile after the change) is satisfied. In FIG. 1, the logical volume A is switched to a logical volume B.

Upon receiving a backup request of the virtual volume A after switching to the logical volume B, the backup control unit 35 refers to the volume configuration table 39 and the backup history table 74, and determines whether the mapping to the virtual volume A has been switched from the logical volume A to the logical volume B.

The backup control unit 35 instructs the command execution unit 46 of the backup management computer 4 to create a backup of the logical volume B as a differential backup between the logical volume B and the logical volume A (S1).

Moreover, upon restoring the backup data of the virtual volume after switching to the logical volume B, the backup control unit 35 refers to the backup history of the virtual volume stored in the backup history table 74, and performs the restoration by using the backup data of the logical volume B and the logical volume A by tracking back the history (S2).

Here, the backup control unit 35 supports the selection of the profile to be applied to the restoration and the restoration destination. Upon presenting the profile of the application candidate, information related to the past records of such profile being set in the virtual volume is also displayed, and provided as information for making the selection.

Based on the foregoing processing, the differential backup between logical volumes and the restoration thereof are enabled.

Figure 2:
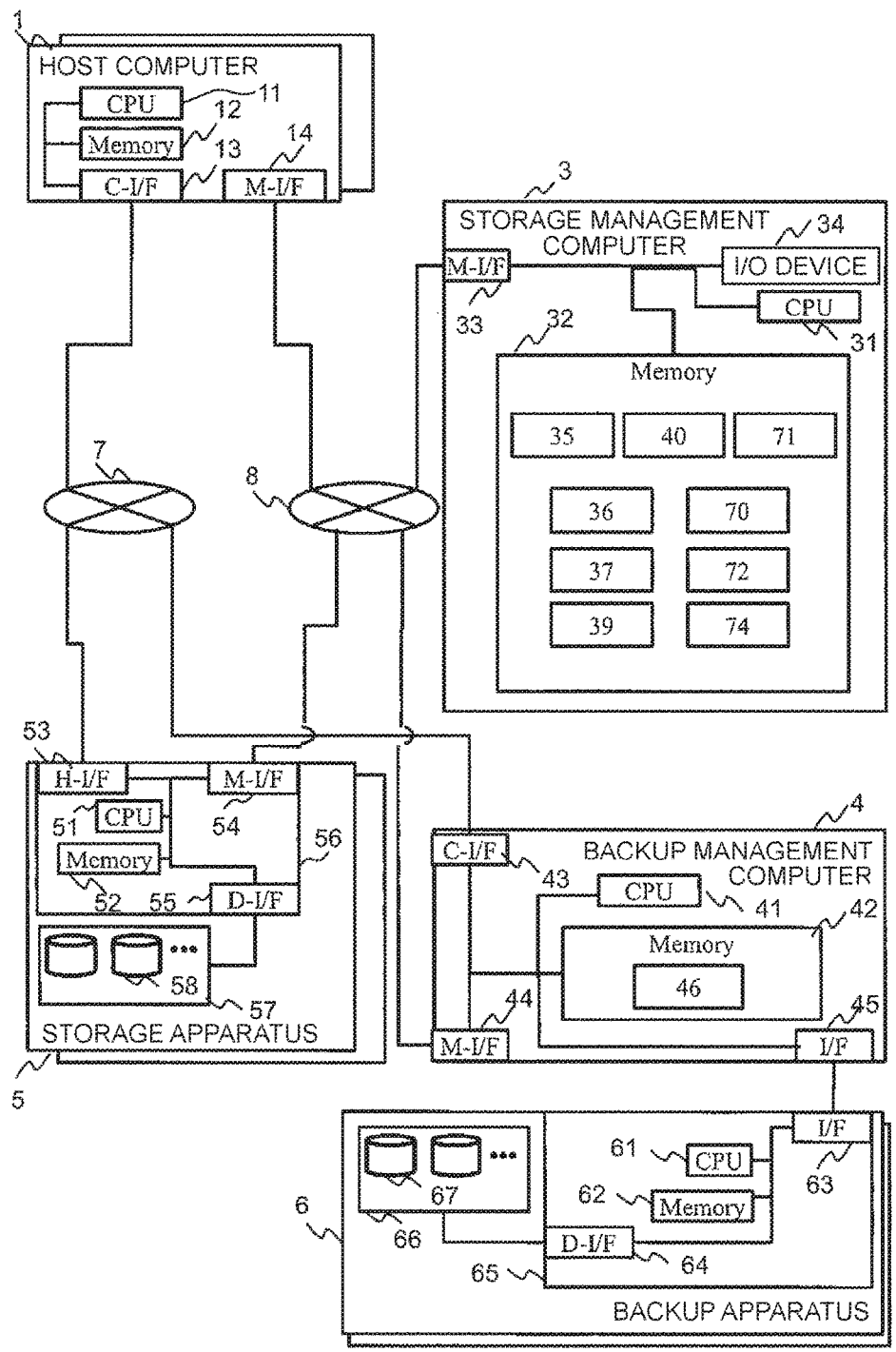
FIG. 2 is a configuration diagram of the computer system according to the first embodiment.

FIG. 2 shows the configuration of the computer system according to the first embodiment. The host computer 1, the backup management computer 4, and the storage apparatus 5 are connected via a data network 7. The host computer 1, the storage management computer 3, the backup management computer 4, and the storage apparatus 5 are connected via the management network 8. The backup apparatus 6 is connected to the backup management computer 4.

The data network 7 is, for instance, a SAN (Storage Area Network), but it may also be an IP (Internet Protocol) network, or some other data communication network. Moreover, the management network 8 is, for instance, an IP network, but it may also be a SAN, or some other data communication network. The network 7 and the network 8 may also be the same network, and the computer 1, the computer 3, and the computer 4 may also be the same computer.

The host computer 1 includes a control device such as a CPU (Central Processing Unit) 11, a storage device such as a memory 12, a C-I/F (Communication-Interface) 13, and an M-I/F (Management-Interface) 14. The host computer 1 may also include an I/O device (keyboard, display device or the like). The CPU 11 executes the programs stored in the memory 120. In the ensuing explanation, any reference to a "CPU" refers to a unit which calls and executes the programs stored in the memory connected thereto. The C-I/F 13 is an interface with the data network 7, and sends and receives data and control commands to and from the backup management computer 4 and the storage apparatus 5, respectively. The M-I/F 14 is an interface with the management network 8, and sends and receives data and control commands to and from the storage management computer 3, the backup management computer 4, and the storage apparatus 5.

The storage management computer 3 includes a CPU 31, a memory 32, an M-I/F 33, and an I/O device 34 such as a liquid crystal display and a keyboard. The M-I/F 33 is an interface with the management network 8, and sends and receives data and control commands to and from the host computer 1, the backup management computer 4, and the storage apparatus 5, respectively.

The memory 32 stores, as programs to be called and executed by the CPU, a backup control unit 35, a volume configuration management unit 40, and a task control unit 71, and, as information to be used in these programs, a profile definition table 36, a profile history table 37, a volume configuration table 39, a storage configuration table 70, a task management table 72, and a backup history table 74.

The backup management computer 4 includes a CPU 41, a memory 42, a C-I/F 43, an M-I/F 44, and an I/F 45. The backup management computer 4 may also include an I/O device (keyboard, display device or the like). The C-I/F 43 is an interface with the data network 7, and sends and receives data and control commands to and from the host computer 1 and the storage apparatus 5, respectively. The M-I/F 44 is an interface with the management network 8, and sends and receives data and control commands to and from the host computer 1, the storage management computer 3, and the storage apparatus 5, respectively. The I/F 45 is an interface for connecting to the backup apparatus 6, and sends and receives data and control commands.

The memory 42 stores a command execution unit 46 as a program which executes the instructions of the storage management computer 3.

The storage apparatus 5 includes a device controller 56 and a physical device 57. The device controller 56 includes a CPU 51, a memory 52, an H-I/F (Host-Interface) 53, an M-I/F 54, and a D-I/F (Disk-Interface) 55. The H-I/F 53 is an interface with the data network 7, and sends and receives data and control commands to and from the host computer 1 and the backup management computer 4, respectively. The M-I/F 54 is an interface with the management network 8, and sends and receives data and control commands to and from the host computer 1, the storage management computer 3, and the backup management computer 4, respectively. The D-I/F 55 sends and receives data and control commands to and from the physical device 57. The physical device 57 includes a plurality of physical storage mediums 58. The plurality of physical storage mediums 58 are, for example, HDDs based on SATA (Serial Advanced Technology Attachment) or SAS (Serial Attached SCSI: Small Computer System Interface), or SSDs (Solid State Drives), but other physical storage mediums may also be used.

The backup apparatus 6 includes a device controller 65 and a physical device 66. The device controller 65 includes a CPU 61, a memory 62, an I/F 63, and a D-I/F 64. The I/F 63 is an interface for connecting to the backup management computer 4, and sends and receives data and control commands. The D-I/F 64 sends and receives data and control commands to and from the physical device 66. The physical device 66 includes a plurality of physical storage mediums 67. The plurality of physical storage mediums 67 are, for example, magnetic tapes or optical disks such as DVDs (Digital Versatile Discs) or BDs (Blu-ray Discs (registered trademark)), but other physical storage mediums may also be used.

Note that the number of respective computers is not limited to the foregoing configuration. Moreover, the configuration may also include a host management computer for managing the host computer 1. Moreover, the data network 7 may also include a switch such as an FC (Fibre Channel) switch, and such switch may be used for sending and receiving data and control commands to and from the C-I/F 13 of the host computer 1 and the D-I/F 55 of the storage apparatus 5, respectively.

FIG. 3 shows the profile definition table 36.

The profile definition table 36 is a table for managing the profile information to be set in the virtual volume. The contents of the profile are the requirements of performance and capacity of the logical volume to be mapped to the virtual volume. The term "profile" may also be referred to as "performance requirement". This table is additionally registered when a profile is newly created, and updated when an existing profile is changed.

This table includes, for example, a profile ID 360, a media type 361, a media rotation speed 362, a Snapshot 363, a Replication 364, and a Provisioning 365.

The profile ID 360 registers information for identifying the profile. The media type 361 registers the type of storage media configuring the logical volume. The media rotation speed 362 registers the rotation speed of the storage media configuring the logical volume. The Snapshot 363 registers information indicating whether a snapshot of the logical volume can be created. The Replication 364 registers information indicating whether the logical volume can be replicated at a local site, replicated at a remote site, or replicated at both sites. The Provisioning 365 registers information indicating whether thin-provisioning and/or thick-provisioning is valid as the method of assigning the capacity of the logical volume. Thin-provisioning is a technology of assigning a real storage area in the size of the write request data upon receiving a data write request for writing data into a volume. Meanwhile, with thick-provisioning, a real storage area of a certain size is assigned to the logical volume in advance.

Even with a logical volume that does not completely coincide with all requirements of the profile, it may be determined that such logical volume satisfies the profile. For example, in cases where the performance of the logical volume is greater in comparison to the profile such as when the rotation speed of the media configuring the logical volume is greater than the value registered in the profile, or, while a snapshot of the logical volume can be created, it is registered in the profile that a snapshot cannot be created, such logical volume may be determined as satisfying the profile.

Moreover, all information of this table does not necessarily have to be managed. The requirements of the profile are not limited to the foregoing example, and may be customized according to the usage of the computer system.

FIG. 4 shows the profile history table 37. The profile history table 37 is an information table for managing the profile application history to the virtual volume. The profile history table 37 is additionally registered based on the control of the CPU of the storage management computer 3 when a virtual volume is newly created and the profile is applied to that virtual volume, or when the profile applied to an existing virtual volume is changed.

This table includes, for example, a virtual volume ID 370, a profile ID 371, and a time stamp 372. The virtual volume ID 370 registers information for identifying the virtual volume. The profile ID 371 registers information for identifying the profile which has an application record of being previously applied to the virtual volume. The time stamp 372 registers date/time information indicating the date/time that the profile was applied to the virtual volume.

FIG. 5 shows an example of the volume configuration table 39.

The volume configuration table 39 is a table for managing the information of the logical volume that is currently mapped to (which corresponds to) the virtual volume, and the latest profile that is being applied to the virtual volume. This table is updated when the profile applied to the virtual volume is changed, and also periodically updated by the CPU of the storage management computer 3 by acquiring information from the host computer 1.

This table includes a virtual volume ID 390, a storage apparatus ID 391, a logical volume ID 392, a profile ID 393, and a volume capacity 394.

The virtual volume ID 390 registers information for identifying the virtual volume. The storage apparatus ID 391 registers information for identifying the storage apparatus that is providing the logical volume corresponding to the virtual volume. The logical volume ID 392 registers information for identifying the logical volume corresponding to the virtual volume. Note that the storage apparatus ID 391 and the logical volume ID 392 may be collectively referred to as "logical volume identifying information". The profile ID 393 registers an ID 360 of the profile being applied to the virtual volume. The volume capacity 394 registers the capacity of the logical volume.

Note that, while this embodiment is described such that the logical volume and the virtual volume are mapped 1-to-1, so as long as the total capacity coincides, they may be mapped 1-to-N or N-to-N.

FIG. 6 shows an example of the storage configuration table 70.

The storage configuration table 70 is a table for managing the configuration information of the storage apparatus. This table is periodically updated based on the control of the CPU of the storage management computer 3 by acquiring information from the storage apparatus 5.

This table includes, for example, a storage apparatus ID 700, a logical volume ID 701, a media type 702, a media rotation speed 703, a Snapshot 704, a Replication 705, a Provisioning 706, and a capacity 707.

The storage apparatus ID 700 registers information for identifying the storage apparatus. The logical volume ID 701 registers information for identifying the logical volume. When "null" is registered, this shows that it is a storage area that has not been assigned to a logical volume. The media type 702 registers the type of the storage media. The media rotation speed 703 registers the rotation speed of the storage media. The Snapshot 704 registers whether a snapshot of the logical volume can be created. The Replication 705 registers information indicating whether the logical volume can be replicated at a local site, replicated at a remote site, or replicated at both sites. The Provisioning 706 registers information indicating whether thin-provisioning and/or thick-provisioning is valid as the method of assigning the capacity of the logical volume. The capacity 707 registers the capacity in which the writing of data is possible.

Note that all information does not necessarily have to be managed, and it will suffice so as long as information corresponding to the set items of the profile definition table 36 is stored.

Information of the volume configuration table 39 and information of the storage configuration table 70 are collectively referred to as "configuration information". Moreover, information of the profile definition table 36 may also be included and collectively referred to as "configuration information".

Figure 7:
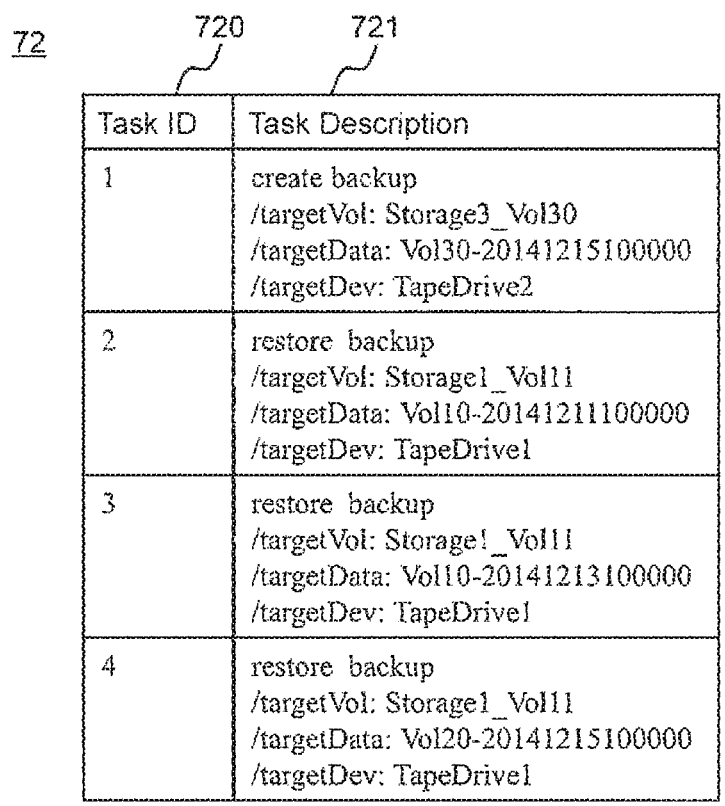
FIG. 7 shows the task management table.

FIG. 7 shows an example of the task management table 72.

The task management table 72 is a table for managing the tasks of the storage management computer 3, and includes information of the tasks to be executed to the backup management computer 4. A task is registered by the task control unit 71 upon receiving a backup or restoration request. In this embodiment, the ensuing explanation is provided on the premise that only the tasks related to backup and restoration are stored, or only such tasks are extracted through filtering.

This table includes a task ID 720, and a task description 721.

The task ID 720 registers information for identifying the task. The task description 721 registers the description of the instruction task to be executed by the storage management computer 3 to the backup management computer 4. When the instruction task is executed, the backup management computer 4 executes processing to the storage apparatus 5 and the backup apparatus 6 according to the instructions. The descriptions of the task include information regarding whether the task to be executed is backup or restoration, and information (parameters) of the logical volume, the backup data, and the backup apparatus to be subject to processing. The registered tasks are executed, in their registered order, by the task control unit 71. For the backup task and the like, the schedule of the execution time may be managed.

FIG. 8 shows an example of the backup history table 74.

The backup history table 74 is a table for managing the history of backups that were executed. When the backup management computer notifies the completion of backup processing to the storage management computer 3 once the backup processing is completed, the backup control unit 35 refers to the volume configuration table 39 and the task management table and registers information related to the backup data.

This table includes, for example, a backup apparatus ID 740, a backup ID 741, a backup type 742, a virtual volume ID 743, a logical volume ID 744, a storage apparatus ID 745, a time stamp 746, a profile ID 747, and a volume capacity 748.

The backup apparatus ID 740 registers information for identifying the backup apparatus where the backup was created. The backup ID 741 registers information for identifying the backup data. The backup type 742 registers information for identifying the type of backup. For example, information for identifying a full backup or a differential backup is registered. The virtual volume ID 743 registers information for identifying the virtual volume to which is mapped the logical volume to be backed up. The logical volume ID 744 registers information for identifying the logical volume to be backed up. The storage apparatus ID 745 registers information for identifying the storage apparatus that is providing the logical volume to be backed up. Note that the storage apparatus ID 745 and the logical volume ID 744 may be collectively referred to as "logical volume identifying information". The time stamp 746 registers information of the date/time that the creation of a backup was completed. Otherwise, the time stamp 746 may also store date/time information related to the execution of the backup task such as the time that the instruction task was executed or the time that the task was scheduled. The profile ID 747 registers an ID 360 of the profile that had been applied to the virtual volume at the time that the backup was created. The volume capacity 748 registers the capacity of the logical volume to be backed up.

In this embodiment, as shown in FIG. 8, the backup history is managed by being associated with the virtual volume and the logical volume. To put it differently, the backup history is managed on a per virtual volume basis. Consequently, the management of backup can be succeeded even when the mapping of the logical volume to the virtual volume is changed and the data used by the VM is transferred between logical volumes.

Figure 9:
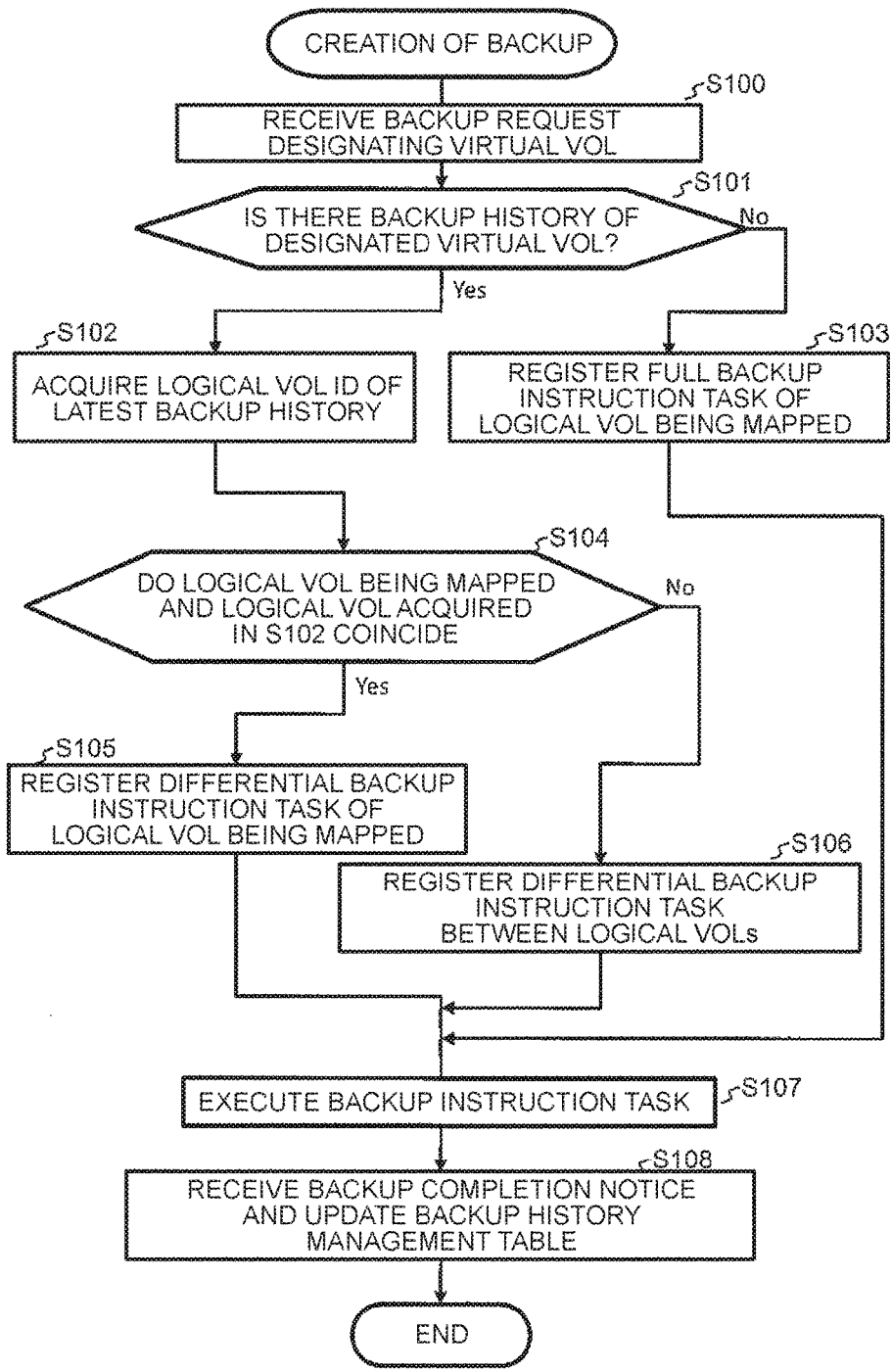
FIG. 9 is a flowchart showing the backup instruction processing.

FIG. 9 shows the processing of the storage management computer 3 instructing the backup management computer 4 to create a backup. The following processing is started upon receiving, based on the user's input, a backup execution request designating the virtual volume from which data is to be backed up and the backup apparatus of the backup destination. Otherwise, the following processing may also be performed periodically according to a scheduled task.

Foremost, the backup control unit 35 receives the user's backup request via the I/O device 34 (S100). The backup request includes the virtual volume ID of the virtual volume to be backed up, and the backup apparatus ID of the backup destination. Moreover, the backup execution time and other information may also be designated.

The backup control unit 35 that received the request refers to the backup history table 74, and confirms whether there is an entry of a backup corresponding to the designated virtual volume (S101).

When there is an entry (Yes in S101), the backup control unit 35 determines that a full backup has previously been created, and creates a differential backup this time around. The backup control unit 35 acquires the storage apparatus ID 745 and the logical volume ID 744 in which the Time Stamp 746 is of the latest entry, and then proceeds to S104 (S102).

When there is no entry (No in S101), it means that this backup is the first backup, and the backup control unit 35 determines that a full backup needs to be created. Thus, the backup control unit 35 refers to the volume configuration table 39, and acquires the storage apparatus ID 391 and the logical volume ID 392 corresponding to the virtual volume. Subsequently, the backup control unit 35 instructs the task control unit 71 to register, in the task management table 72, the task of creating a full backup of the logical volume for which the ID has been acquired in the designated backup apparatus, and then proceeds to S107 (S103).

In S104, the backup control unit 35 determines whether the logical volume mapped to the virtual volume has been switched after the execution of the previous backup. Subsequently, the backup control unit 35 refers to the volume configuration table 39, acquires the storage apparatus ID 391 and the logical volume ID 392 currently mapped to the virtual volume, and confirms whether they coincide with the storage apparatus ID 745 and the logical volume ID 744 acquired in S102.

When they coincide (Yes in S104), the backup control unit 35 determines that the mapping of the logical volume has not been switched after the previous backup, and instructs the task control unit 71 to register, in the task management table 72, the task of creating a differential backup of the logical volume in the designated backup apparatus, and then proceeds to S107 (S105).

When they do not coincide (No in S104), the backup control unit 35 determines that the mapping of the logical volume to the virtual volume has been switched. Subsequently, the backup control unit 35 instructs the task control unit 71 to register, in the task management table 72, the task of creating a differential backup regarding the data of the logical volume of the ID 392 as the transfer source and the logical volume acquired in S102 as the transfer destination in the designated backup apparatus, and then proceeds to S107 (S106).

The task control unit 71 acquires parameters from the task management table, and then creates and executes an instruction command (S107).

In accordance with the instructions given by the storage management computer 3 based on the execution of the instruction command, the command execution unit 46 of the backup management computer 4 executes backup processing or restoration processing to the storage apparatus 5 or the backup apparatus 6.

Upon receiving a completion notice from the backup management computer 4 once the backup is complete, the backup control unit 35 registers the information of the completed backup in the backup history table 74 (S108).

As a result of the storage management computer 3 creating and retaining the backup history table 74 for managing the data backup history on a per virtual volume basis, it is possible to detect, when performing the backup, that the logical volume has been switched after the previous backup, and thereby succeed the management information of the backup across logical volumes. Based on this processing, it is possible to create a differential backup between logical volumes, and the availability of the computer system can be improved. Moreover, in a virtualized computer system, because it is possible to issue a backup request by designating the virtual volume as the unit to be provided to the host computer, rather than designating the actual logical volume to be backed up, it is possible to support the system operation management.

The overview of the backup control unit 35 receiving the restoration instruction and then executing the restoration is now explained.

Foremost, the backup control unit 35 receives the user's input of the restoration instruction designating the backup data. Upon receiving the restoration instruction, the backup control unit 35 refers to the storage configuration table 70 and searches for a storage apparatus that is capable of providing a logical volume required for the restoration. If no such storage apparatus exists, the backup control unit 35 outputs a message to the effect that the unused capacity of the system is insufficient, and a configuration change of the storage apparatus, such as an addition of a storage media, is required for the restoration, and then ends the processing. While this processing is for preventing the wasteful use of resources as a result of performing subsequent processing when the unused capacity of the system is insufficient to begin with, this processing does not need to be performed.

Next, the backup control unit 35 extracts a candidate of a profile that can be applied to the restoration, and instructs the I/O device to output the extracted candidate. The expression "can be applied" refers to the existence of a storage apparatus capable of providing a logical volume which satisfies the profile and has the capacity required for the restoration. The contents to be output will be described later with reference to FIG. 10, and the specific processing thereof will be described later with reference to FIG. 11.

The backup control unit 35 determines the profile to be applied to the restoration by receiving the selection of the existing profile presented by the I/O device, or by receiving the creation of a new profile. The details will be described later with reference to FIG. 10.

Next, the backup control unit 35 instructs the I/O device 34 to output the storage apparatuses that satisfy the determined profile as a restoration destination candidate list. In other words, the backup control unit 35 outputs information of the storage apparatuses that can be used for the restoration which were confirmed upon extracting the profile candidates. The backup control unit 35 receives the user's input of selection via the I/O device 34, and thereby determines the restoration destination storage apparatus.

The backup control unit 35 registers the task of restoration of the determined restoration destination storage apparatus in the task management table, and then gives the restoration instruction by executing the task. The details will be described later with reference to FIG. 12.

Upon receiving a data restoration completion notice from the backup management computer 4, the backup control unit 35 maps the virtual volume to the logical volume in which data was restored, and then ends the processing.

Note that the expression "a storage apparatus that is capable of providing a logical volume required for the restoration" refers to the storage apparatus being able to ensure an unused capacity that is greater than the capacity required for the restoration. Subsequently, the backup control unit 35 refers to the storage configuration table 70 and the volume configuration table 39, calculates, for each storage apparatus, the total capacity of the capacity of the logical volumes that are not mapped to the virtual volume and the capacity of the storage areas that are not assigned to the logical volume, and determines the existence of a storage apparatus in which the calculated capacity is greater than the capacity required for the restoration. The capacity required for the restoration is calculated by the backup control unit 35 referring to the backup history table 74 and acquiring the volume capacity 748 corresponding to the designated backup ID.

FIG. 10 shows a configuration example of the selection screen D31 of the profile to be applied in the restoration.

The selection screen D31 is a screen to be displayed for the I/O device 34 of the storage management computer 3 to receive the selection of the profile to be applied to the restoration when the restoration of backup data is requested.

This screen includes, for example, a message display part D310, display parts D311 and D312 for displaying candidates of the profile to be applied to the restoration, and a display part D313 for receiving an instruction of creating a new profile.

The message display part D310 displays information of the backup data designated in the restoration instruction, and operational instructions to the user.

The display part D311 displays the existing profiles with an application history to the virtual volume to be restored among the profiles that can be applied in terms of the configuration of the storage apparatus. Here, the expression "can be applied" refers to the existence of a storage apparatus capable of providing a logical volume which satisfies the profile and has the capacity required for the restoration. The display part D312 displays the existing profiles with no application history to the virtual volume to be restored among the profiles that can be applied to the restoration.

When restoration is to be implemented, if the usage of the virtual volume is the same as before the restoration, it would be preferable to apply a profile that is the same as or similar to the previously applied profiles. However, the virtual volume after the restoration may not necessarily be the same as the previous usage. Thus, by presenting all profiles that can be applied and then displaying them separately depending on their application record to the virtual volume, it is possible to support the user's selection of the profile to the virtual volume.

Furthermore, the display part D312 which displays the profiles with no application record may also display the profiles in order from those which are most approximate to the profiles with an application record. In FIG. 10, because the profile of ID 300 is a profile which differs from the profile of ID 102 with an application record only with respect to the point that its snapshot function is valid, it is displayed above the other profiles.

Note that, while this embodiment classifies and displays the application candidate profiles depending on whether or not they have an application record to the virtual volume to be restored, the display format is not limited thereto. Alternatively, the number of applications of the respective profiles may be displayed. Furthermore, when the application record of a specific profile is especially a large number such as when that volume is being used as a template, such profile may be highlighted. Moreover, the display may also recommend the profile that was applied to the generation of the backup data to be restored. The extraction processing of the existing profiles of application candidates will be described later with reference to FIG. 11.

The display part D313 is a screen for receiving the instruction of creating a new profile without selecting the profile to be applied to the restoration from the existing profiles. When a check is input in the display part D313 and the "Select" button is pressed, the screen switches to a new profile creation screen. On the new screen, the items that need to be set for creating a new profile and the parameter values that can be set for the respective items are displayed, and the new profile is created by receiving the selection input of the parameter values.

Upon receiving the input, the backup control unit 35 refers to the storage configuration table 70 and searches for a storage apparatus capable of providing a logical volume which satisfies the selected parameter values and has the capacity required for the restoration. Items for which parameter values are not input in the items to be set for the new profile may be treated as items in which the parameter values are not limited.

When there is a storage apparatus that satisfies the conditions as a result of the search, the backup control unit 35 determines that it is a settable profile, and newly registers the profile in the profile definition table 36. Furthermore, the backup control unit 35 instructs the I/O device 34 to display the storage apparatus that satisfies the conditions as a restoration destination candidate. When there is no storage apparatus that satisfies the conditions, the backup control unit 35 determines that it is a profile that can be set, but not applied, at such point in time, and outputs a message to the effect that the setting items of the new profile need to be re-input.

Figure 11:
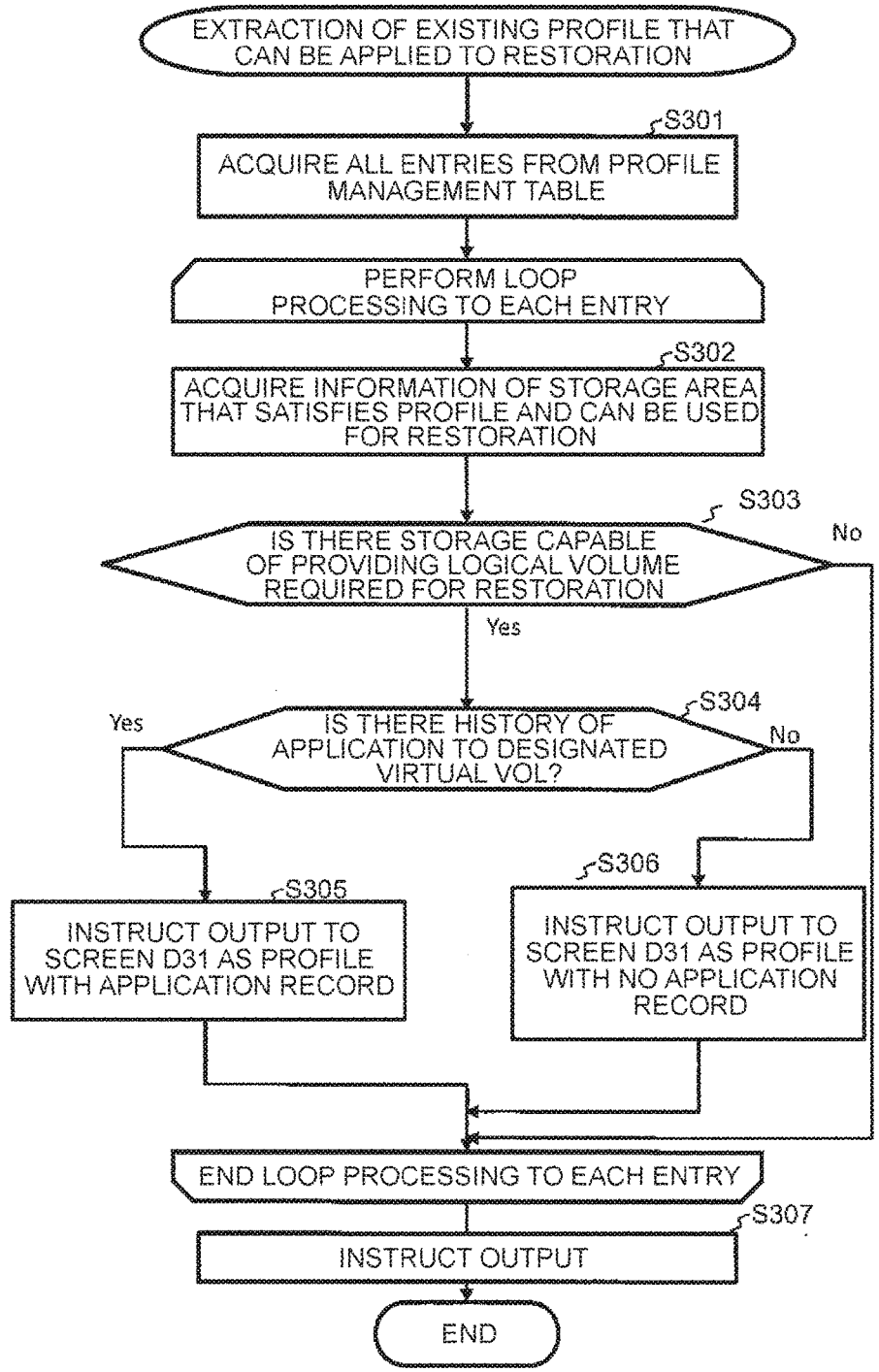
FIG. 11 is a flowchart showing the processing of extracting the profile that can be applied to the restoration.

FIG. 11 shows the details of the processing for extracting the profiles that can be applied to the restoration among the existing profiles.

Foremost, the backup control unit 35 refers to the profile definition table 36, and acquires all entries (S301). Subsequently, the backup control unit 35 performs the processing of S302 to S306 to the respective entries acquired in S301.

The backup control unit 35 refers to the storage configuration table 70 and the volume configuration table 39, and searches for an entry that satisfies the profile acquired in S301 among the logical volumes not mapped to the virtual volume and the storage areas not assigned to the logical volume (logical volume ID is "null") (S302).

Next, the backup control unit 35 determines whether there is a storage apparatus capable of providing a logical volume required for the restoration (S303). Specifically, the backup control unit 35 calculates, for each storage apparatus, the total capacity of the entries acquired in S302, and determines the existence of a storage apparatus in which the calculated capacity is greater than the capacity required for the restoration. As the restoration destination, a logical volume that has been created, but not yet used, may also be used. Moreover, when there is no appropriate logical volume, a logical volume to be used for the restoration may be newly created by using a non-assigned storage area or allocating a storage area by canceling the capacity assignment of the logical volume.

When there is no storage apparatus capable of providing a logical volume required for the restoration (No in S303), the backup control unit 35 determines that the profile cannot be applied, and performs the processing of S302 to the next existing profile.

When there is a storage apparatus capable of providing a logical volume required for the restoration (Yes in S303), the backup control unit 35 refers to the profile history table 37, and confirms whether that profile has a history of having been applied to the designated virtual volume (S304).

When the profile has an application history (Yes in S304), the backup control unit 35 determines that it should be displayed on the profile selection screen D31 as a profile with an application record and temporarily stores the profile in the memory 32, and performs the processing of S302 to the next existing profile (S305).

When the profile has no application history (No in S304), the backup control unit 35 determines that it should be displayed on the profile selection screen D31 as a profile with no application record and temporarily stores the profile in the memory 32, and performs the processing of S302 to the next existing profile application record (S306).

When the foregoing processing is completed for all profiles, the backup control unit 35 instructs the I/O device 34 to output information of the profile to be displayed which was temporarily stored in the memory (S307), and then ends the processing. Note that, if there is no profile that can be applied, the I/O device 34 may output a message to the effect that restoration cannot be performed unless a profile is newly created or the storage configuration is changed.

The screen to be output is as illustrated in FIG. 10. Note that, as described above, the number of applications may be additionally displayed, or the profiles may be presented in order from the profile with conditions that are closest to the profile with an application record. In the foregoing case, processing which corresponds to the contents to be displayed is performed in S304 onward.

Note that, because the storage apparatus to become the restoration destination candidate is presented after the profile to be applied is selected, information of the storage apparatus capable of performing restoration that was searched in S303 may be temporarily stored in the memory.

Figure 12:
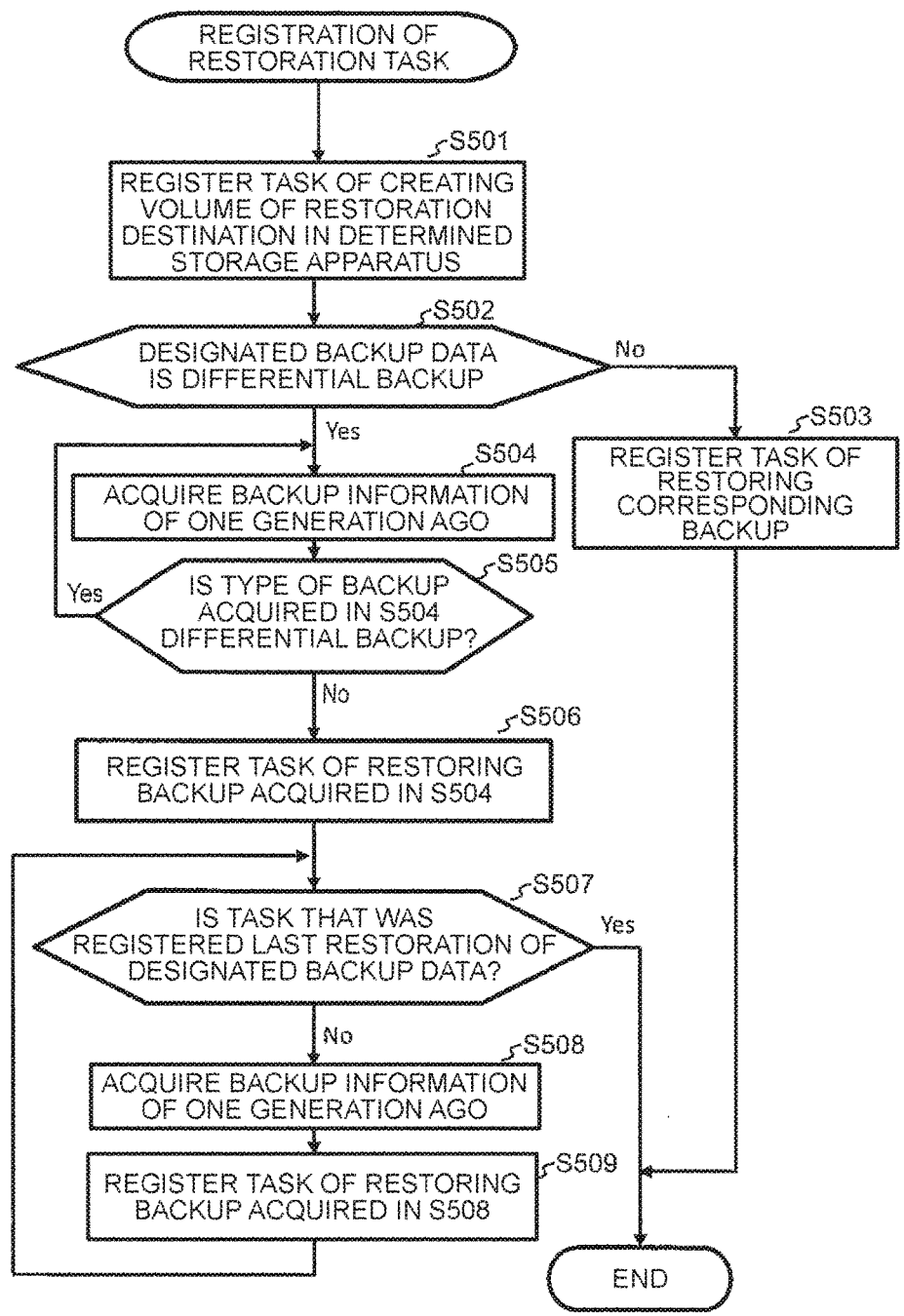
FIG. 12 is a flowchart showing the registration processing of the restoration task.

FIG. 12 shows the processing of registering the restoration task after the restoration destination storage apparatus is determined as a result of receiving the user's selection input.

Foremost, the backup control unit 35 registers, in the task management table 72 via the task control unit 71, the task of creating a restoration destination logical volume in the determined storage apparatus (S501). This processing is performed when it is necessary to newly create a restoration destination logical volume. A restoration destination logical volume does not need to be newly created when it is possible to perform restoration to the existing logical volume that has not been assigned to a virtual volume. Moreover, if required for securing the capacity of a volume, processing of cancelling the assignment of the storage area to the existing logical volume may also be performed.

Next, the backup control unit 35 refers to the backup history table 74, acquires the backup type 742 of the backup data to be restored, and confirms whether the backup data is a full backup or a differential backup (S502).

In the case of a full backup (No in S502), the backup control unit 35 registers, in the task management table 72 via the task control unit 71, the task of restoring the user's designated backup data in the restoration destination volume created based on the task registered in S501, and then ends the processing (S503).

In the case of a differential backup (Yes in S502), it is necessary to restore all backup data from the first full backup to the designated generation. Thus, the backup control unit 35 refers to the backup history table 74, and acquires information of the backup of one generation before the backup data by confirming the Time Stamp 746 of the backup history of the virtual volume corresponding to the user's designated backup data (S504).

Next, the backup control unit 35 refers to the backup history table, and confirms whether the backup type 742 of the generation acquired in S504 is a full backup or a differential backup (S505).

In the case of a differential backup (Yes in S505), the backup control unit 35 returns to S504, and once again acquires the backup information of another generation before the foregoing acquired information.

In the case of a full backup (No in S505), the backup control unit 35 registers, in the task management table 72 via the task control unit 71, the task of restoring the full backup acquired in S504 in the restoration destination volume that was created based on the task registered in S501 (S506).

Next, the backup control unit 35 refers to the target data of the task that was last registered in the task management table 72, and confirms whether the task is a task of restoring the backup data to be restored (S507).

If the task is a task of restoring the designated backup data (Yes in S507), the backup control unit 35 ends the processing.

If the task is not a task of restoring the designated backup data (No in S507), the backup control unit 35 acquires the backup data of one generation after the backup data based on the same method as the processing of S504 (S508).

Next, the backup control unit 35 registers, in the task management table 72 via the task control unit 71, the task of restoring the backup data acquired in S508 in the restoration destination volume that was created based on the task registered in S501, and then returns to S507 (S509).

Even if a differential backup across logical volumes has been created, by using the backup history table of this embodiment, it is possible to implement the restoration by acquiring data related to the designated backup data as described above.

According to the foregoing first embodiment, even in cases where the logical volume mapped to the virtual volume is switched, the backup of the logical volume after the switch can be performed as a differential backup to the backup of the logical volume before the switch. Moreover, it is possible to realize the restoration of a differential backup that was created between logical volumes. Furthermore, by presenting the application record of the profile, which is the candidate to be applied to the restoration, to the virtual volume upon receiving a backup data restoration request, it is possible to support the user's selection of the profile and the selection of the restoration destination. It is thereby possible to reduce the operation management cost required for performing the backup or restoration.

Note that, in this embodiment, the storage management computer 3 comprises the backup control unit 35 and gives backup and restoration instructions to the backup management computer 4. As a modified example, the backup management computer 4 may receive backup and restoration requests from the user, and store the task of executing the request in its own memory. The backup management computer 4 is unable to recognize a virtual volume. In the foregoing case, foremost, the storage management computer 3 acquires, from the backup management computer 4, task information indicating the task that is scheduled to be executed. In relation to the backup task included in the task information, whether to perform a differential back across logical volumes should be determined based on the mapping of the target logical volume and the virtual volume. The determination result may be presented to the backup management computer 4.

Moreover, restoration can also be performed based on the modified example of this embodiment.

Embodiment 2

In the first embodiment, the selection of the profile and restoration destination storage apparatus for performing restoration was supported by storing the application history of the profile to the virtual volume. Nevertheless, depending on the mode of usage of the volume by the application, it is necessary to select the restoration destination by giving consideration to the conditions (restrictions) of the configuration related to the storage apparatus, such as the configuration of the host computer to access the volume, in addition to the performance profile requirements.

In the second embodiment, upon presenting the restoration destination candidate storage apparatus, the necessity of changing the configuration of the storage apparatus is determined, and, by displaying the determination result, the efficient operation of the virtualized computer system is supported.

In the ensuing explanation, the differences in comparison to the first embodiment are mainly explained, and descriptions regarding equivalent constituent elements, programs with equivalent functions, and tables with equivalent items may be omitted.

Figure 13:
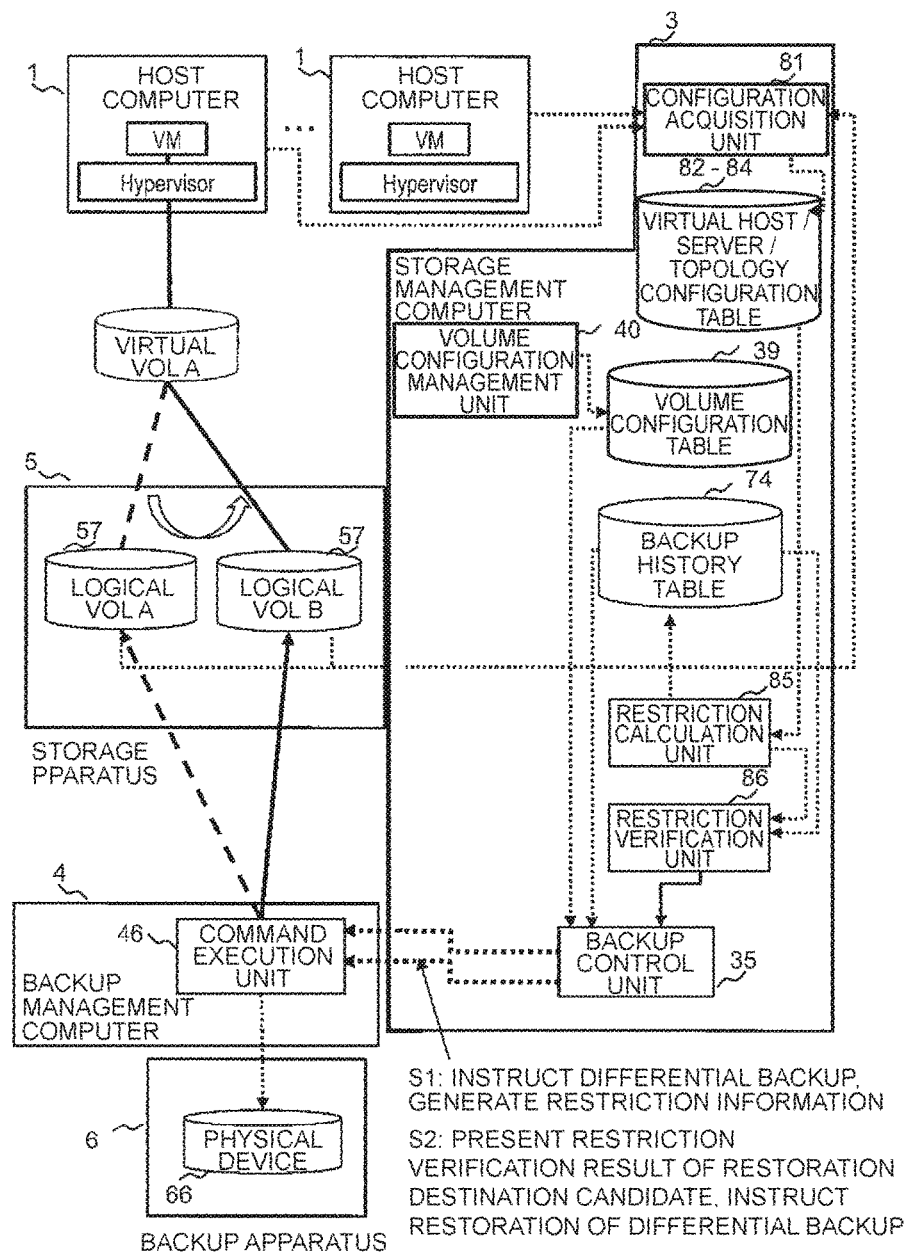
FIG. 13 shows the overview of the second embodiment.

FIG. 13 is a diagram showing the overview of the second embodiment.

A configuration acquisition unit 81 of the storage management computer 3 acquires configuration information of the host computer 1, configuration information of the host computer 1, and topology information between the host computer 1 and the storage apparatus 5, and registers the acquired information in a virtual host configuration table 82, a server configuration table 83, and a topology configuration table 84.

Upon receiving a virtual volume backup request, the backup control unit 35 calls a restriction calculation unit 85. The restriction calculation unit 85 acquires configuration information related to the virtual volume to be backed up from the virtual host configuration table 82, the server configuration table 83, and the topology configuration table 84.

The restriction calculation unit 85 determines whether there are any restrictive conditions that should be given consideration upon performing the restoration with regard to the acquired configuration information, and, upon determining that there are restrictive conditions, creates restriction information that is linked to the backup history. The identifier of the created restriction information is registered in the form of adding an item to the backup history table 74 of Embodiment 1, and managed by being associated with the information of the backup data (S1).

The restriction verification unit 86 refers to the backup history table 74 upon receiving a restoration request, and acquires the restriction information associated with the backup to be restored.

When the backup control unit 35 extracts a restoration destination candidate storage apparatus that satisfies the profile, the restriction verification unit 86 acquires the configuration information related to the candidate storage apparatus from the configuration tables 82-84. The backup control unit 35 verifies whether the configuration information related to the restoration destination candidate storage apparatus satisfies the restriction information linked to the backup, and presents the verification result indicating whether or not a configuration change is necessary (S2).

As described above, by determining and presenting whether the restoration destination candidate satisfies the restrictive conditions of the configuration related to the mode of usage of the volume by the application, it is possible to provide, to the user, information for selecting the restoration destination storage apparatus.

Unlike the first embodiment, the storage management computer 3 according to the second embodiment stores, in the memory 32, the foregoing configuration acquisition unit 81, restriction calculation unit 85, restriction verification unit 86, virtual host configuration table 82, server configuration table 83, and topology configuration table 84. Furthermore, the storage management computer 3 has a repository for storing a restoration restriction 89 which is restriction information linked to the backup history, and general rules 87 and a restriction template 88 to be used for creating the restoration restriction 89. The storage management computer 3 additionally includes a restriction verification result management table 91 which stores the verification result of the restoration restriction 89. The details of the respective types of information will be described later.

The configuration acquisition unit 81 periodically acquires configuration information related to the virtual host of the computer system, configuration information related to the physical host, and information related to the topology of the storage apparatus and the physical host, and registers the acquired information in the virtual host configuration table 82, the server configuration table 83, and the topology configuration table 84, respectively. As the method of the configuration acquisition unit 81 to acquire information from various types of devices, an acquisition method based on SNMP (Simple Network Management Protocol), or a method of using an original protocol, may be adopted.

The tables for managing the acquired information do not need to be divided into tables 82-84 as shown with the configuration of this embodiment, and may also be managed as one table.

In this embodiment, while information regarding the storage apparatus, physical host, virtual host, and running application are collected and stored, it will suffice so as long as information to be used as the restriction information to be verified is stored, and the type and format of information to be recorded are not limited to the methods described in these tables.

FIG. 14 shows the virtual host configuration table 82.

The virtual host configuration table 82 is a table for managing information of the VM (virtual host) running on the host computer. This table includes, for example, a virtual host ID 820, a virtual I/F count 821, a virtual volume ID 822, and a running application 823.

The virtual host ID 820 registers information for identifying the virtual host. The virtual I/F count 821 registers the number of I/Fs for sending and receiving data to and from the storage apparatus which are recognized by the virtual host. The virtual volume 822 registers information for identifying the virtual volume that is being provided to the virtual host. The running application 823 registers the application that is running on the virtual host.

FIG. 15 shows the server configuration table 83.

The server configuration table 83 is a table for managing information related to the host computer 1 (physical host) existing in the computer system. This table includes, for example, a physical host ID 830, a physical I/F count 831, and a virtual host ID 832. The physical host ID 830 registers information for identifying the host computer. The physical I/F count 831 registers the number of I/Fs for sending and receiving data to and from the storage apparatus equipped in the host computer. The virtual host ID 832 registers information for identifying the virtual host running on the host computer.

FIG. 16 shows an example of the topology configuration table 84.

The topology configuration table 84 is a table for managing the topology information of the storage apparatus 3 and the host computer 1 (physical host). This table includes, for example, a storage apparatus ID 840, and a physical host ID 841. The storage apparatus ID 842 registers information for identifying the storage apparatus. The physical host ID 841 registers information for identifying the host computer that is connected to the storage apparatus.

FIG. 17 shows an example of the general rules 87.

The general rules 87 are information for defining the restrictive conditions of the connection relation between the device and software program using the volume to be backed up and other devices and software programs. A case where each configuration information is in a state of coinciding with the condition part 871 of the general rules 87 is hereinafter referred to as the restoration is "subject to restriction".

This information is stored in the repository in advance upon receiving the user's input. This information includes, for example, a general rule ID 870, a condition part 871, a device part 872, a device 873, a condition 874, and applicable restriction information ID 875.

The general rule ID 870 registers information for identifying the general rules. The condition part 871 is configured from one or more condition sets including a device part 872, a device 873, and a condition 874. The device part 872 registers the target device part name. The device 873 registers the device name related to the device part. The condition 874 registers information related to the status of the device part. The applied restriction template ID 875 registers information for identifying the restriction template 88 to be applied when the conditions of the general rules are satisfied. The restriction template 88 will be described later with reference to FIG. 18.

For example, the general rules of FIG. 17 show that the general rule ID 870 is 1, and that, as the conditions, there is a VM linked to the volume to be backed up and an application of a WebServer is running on such VM, and the ID of the restriction template to be applied upon satisfying the foregoing conditions is A.

In FIG. 17, while the backup volume and the virtual host and the application are described as the contents of the general rules, it will suffice so as long as the conditions that are recommended for the restoration in relation to the virtual volume to be backed up are described. For instance, (condition part 1) the logical volume has been assigned by the storage apparatus, and (condition part 2) the storage apparatus comprises the remote copy function, is also acceptable. The contents may be created according to the usage of the computer system, and the contents are not limited to the foregoing example. The storage management computer 3 collects and manages the configuration information corresponding to the contents of the condition part.

FIG. 18 shows an example of the restriction template 88.

The restriction template 88 is information to become the template for generating specific restriction contents when the configuration related to the volume to be backed up is determined to be subject to restriction as a result of referring to the general rules. This information is stored in the repository in advance upon receiving the user's input.

This information includes, for example, a restriction template ID 880, a variable 881, an acquisition metrics 882, a target device 883, an acquisition timing 884, and a restriction 885.

The restriction template ID 880 registers information for identifying the restriction template. The variable 881 is configured from one or more variable sets including an acquisition metrics 882, a target device 883, and an acquisition timing 884. The acquisition metrics 885 registers the name of the metrics subject to restriction. The target device 886 registers the device name subject to the acquisition metrics. The acquisition timing 887 registers information for designating the timing of acquiring the acquisition metrics. The restriction 888 registers the conditions to be satisfied by the variable as a restriction.

For example, the restriction information of FIG. 18 shows that the restriction template ID 880 is A, there is an I/F count of the VM linked to the volume to be backed up as the variable to be acquired when performing the backup, there is an I/F count of the physical host related to the volume to be restored as the variable to be acquired when performing the restoration, and the latter variable being greater than the former variable is the restrictive condition. In other words, restoration to the logical volume connected to a physical host having a number of I/Fs that is greater than the number of I/Fs required by the VM is recommended.

Here, while the I/F count is indicated as an example of the metrics, this may also be the number of CPUs or the type of memories of the host computer. Moreover, the target device may also be other than the VM or the host computer. In the foregoing case, the storage management computer 3 will manage the corresponding configuration information.

FIG. 19 shows an example of the restoration restriction 89.

The restoration restriction 89 is information showing the specific restriction contents related to the restoration destination volume. This information is generated by the restriction calculation unit 85 based on the configuration information related to the volume to be backed up which is acquired from the virtual host configuration table 82, the server configuration table 83, and the topology configuration table 84 when performing the backup, and the general rules 87 and the restriction template 88.

This information includes, for example, a restoration restriction ID 890, a metrics 891, a target device 892, a restriction type 893, and a value 884.

The restoration restriction ID 890 registers information for identifying the restoration restriction. The metrics 891 registers the metrics subject to restriction. The target device 892 registers the name of the device subject to the metrics. The restriction type 893 registers the type of restriction that is applicable to the metrics. The value 894 registers the value that is set to the restriction type.

FIG. 19 shows that, with the restoration restriction having the ID 890 of A-1, there is one restriction when performing the restoration, and the content of such restriction is that the I/F count of the physical host related to the volume to be restored is 3 or more. The restoration restriction 89 may also be independently referred to as "restriction information". Moreover, the restriction template 88 and the restoration restriction 89 to be used for creating the restoration restriction 89 may collectively be referred to as "restriction information", or the general rules 87 may be additionally added thereto.

The backup history table 74 of Embodiment 2 stores, in addition to the information of Embodiment 1, a restoration restriction ID 890 that was generated when performing the backup by associating it with information of the backup data (not shown).

Figure 20:
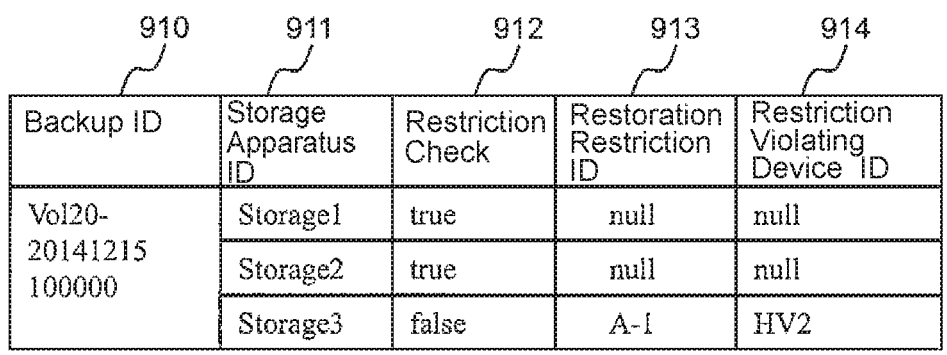
FIG. 20 shows a configuration example of the restriction verification result table according to the second embodiment.

FIG. 20 shows an example of the restriction verification result management table 91. The restriction verification result management table 91 is a table for managing the result of the verification performed by the restriction verification unit 86, when performing the restoration, regarding whether the configuration information related to the restoration destination candidate storage apparatus satisfies the restoration restriction 89 of the backup data to be restored, and instructing the I/O device 34 to output such result. The restriction verification result management table 91 is created and updated by the restriction verification unit 86 based on the restriction template 88, the restoration restriction 89, and information of the respective configuration tables.

This table stores a backup ID 910, a storage apparatus ID 911, a restriction check 912, a restoration restriction ID 913, and a restriction violating device ID 914. The backup ID 910 registers an ID 741 for identifying the backup. The storage apparatus ID 911 registers an ID 700 for identifying the storage apparatus that was extracted as a restoration destination candidate of the backup of the backup ID. The restriction check 912 registers information indicating whether the restoration restriction related to the backup is satisfied upon being restored to the storage apparatus. The restoration restriction ID 913 registers an ID 890 of the restoration restriction determined as not being satisfied based on the restriction check. The restriction violating device ID 91e registers information for identifying the device that is causing the non-satisfaction of the restoration restriction when it is determined that the restoration restriction is not satisfied based on the restriction check.

For example, in FIG. 20, there are the storage apparatuses of Storage 1, Storage 2, and Storage 3 as the restoration destination candidates of the backup Vol 20-20141215100000, and, while Storage 1 and Storage 2 satisfy the restoration restriction, Storage 3 does not satisfy the restoration restriction of A-1, and the cause thereof is the configuration of the physical host HV2.

Figure 21:
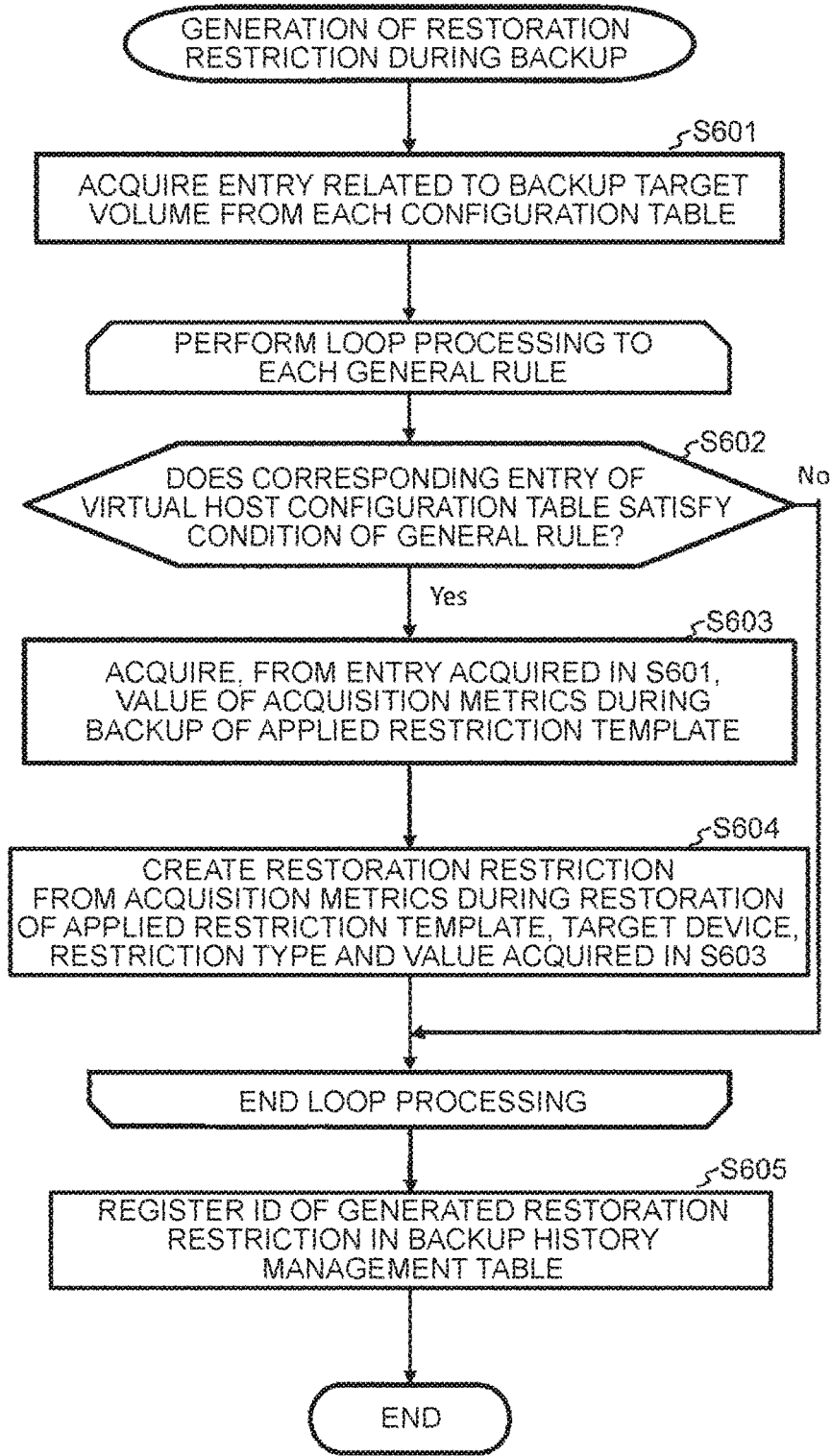
FIG. 21 is a flowchart showing the processing of generating the restoration restriction to be applied when performing the backup according to the second embodiment.

FIG. 21 shows the processing of generating the restoration restriction 89.

The following processing is started upon receiving a backup request designating a volume.

Foremost, upon receiving a backup request from the I/O device 34, the backup control unit 35 calls the restriction calculation unit 85, and the restriction calculation unit 85 refers to the virtual host configuration table 82, the server configuration table 83, and the topology configuration table 84 and acquires the entries corresponding to the designated volume to be backed up (S601). For example, when "VVOL1" is designated as the backup target, the first entry (entry of the first line) is acquired from the virtual host configuration table 82. Because the virtual host related to "VVOL1" is "VM1", the first entry (entry of the first line) is acquired from the server configuration table 83, and, because the physical host related to "VM1" is "HV1", the first entry (entry of the first line) and the second entry (entry of the second line) are acquired from the topology configuration table 84.

The processing of S602 to S605 explained below is performed as loop processing to the respective general rules stored in the repository.

In S601, whether the entries acquired from the virtual host configuration table 82 satisfy the condition part 871 of the general rules 87 is confirmed (S602).

When the entries do not satisfy the condition part 871 (No in S602), the processing performed to the general rules is ended.

Figure 22:
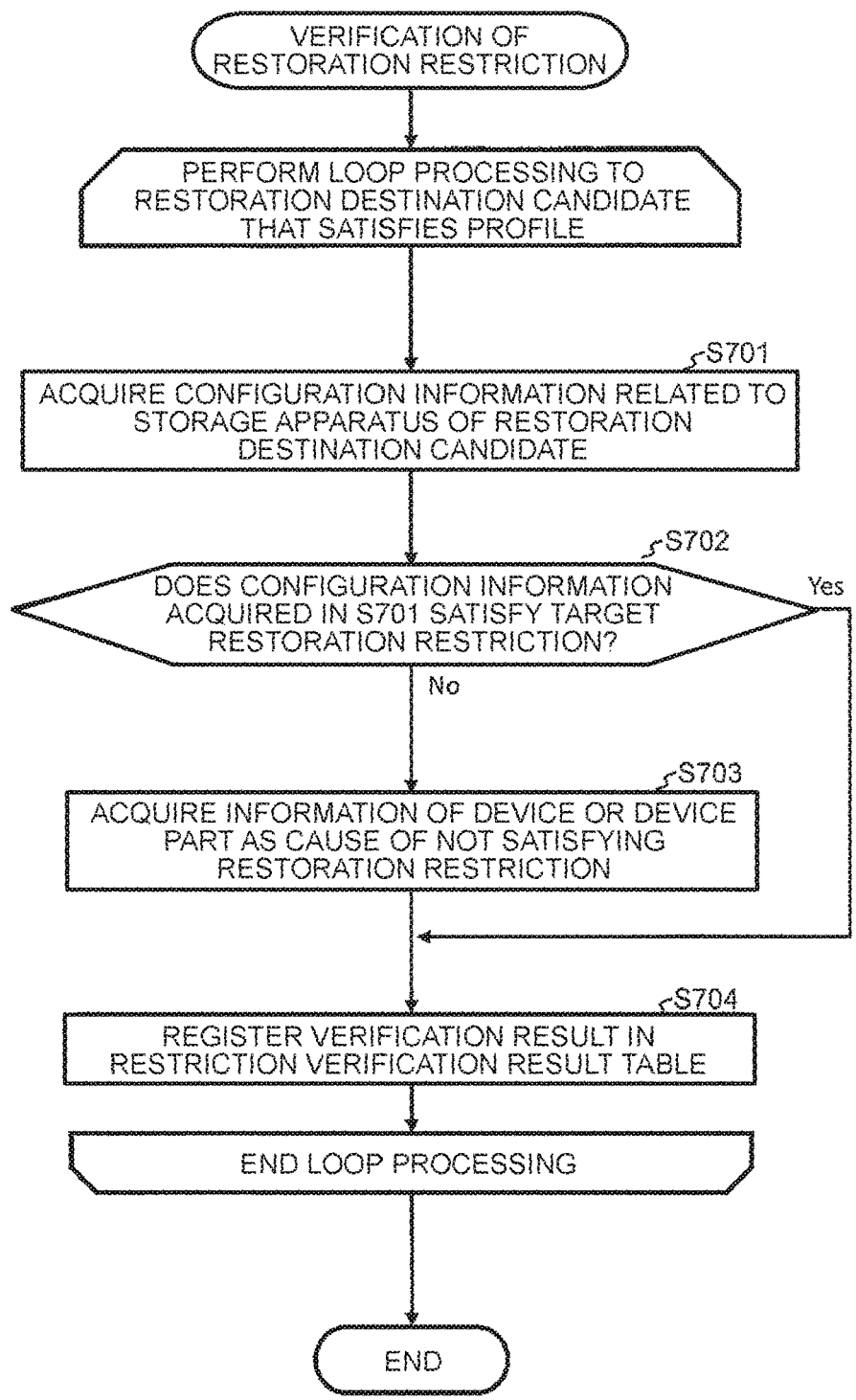
FIG. 22 is a flowchart showing the processing of verifying the restriction of the restoration destination candidate storage apparatus according to the second embodiment.

When the entries satisfy the condition part 871 (Yes in S602), the restriction template 88 corresponding to the applied restriction template ID 875 of the general rules is acquired from the repository, and the acquisition metrics 882 of the condition in which the acquisition timing 884 in the restriction information is at the time of backup is acquired from the entries acquired in S601 (S603). For example, when it is determined in S602 that the condition part of the general rules of FIG. 21 is satisfied, restriction information in which the ID of FIG. 22 is "A" is acquired, and the "I/F count" of the "VM" of the variable 1 in which the acquisition timing is at the time of "backup" is acquired from the entries acquired from the virtual host configuration table 82.

Next, the metrics 891, the target device 892, the restriction type 892, and the value 894 of the restoration restriction 89 are defined based on the acquisition metrics 882, the target device 883 and the restriction 885, which are the conditions when the acquisition timing 884 in the restriction information is at the time of "restoration", and the information acquired in S603, and then assigned the ID 890 to generate the restoration restriction (S604). For example, in the case of the restoration restriction of FIG. 19 to be created using the restriction temple of FIG. 18, the "I/F count" of the variable 2 in which the acquisition timing of the restriction information is at the time of "restoration" is defined in the metrics of the restoration restriction, the target device "connection destination physical host" of the variable 2 of the restriction information is defined in the target device of the restoration restriction, the restriction type of the restoration restriction is defined based on the restriction of "variable 2 is greater than variable 1" of the restriction information, and the "I/F count" of the "VM" acquired in S603 is defined in the value of the restoration restriction.

When the backup based on the processing explained with reference to FIG. 9 is completed, the restoration restriction ID of the restoration restriction created in S604 is registered in the entry corresponding to the backup of the backup history table 74.

The generation of the restoration restriction may also be performed in parallel with the registration processing of the backup creation instruction task explained with reference to FIG. 9.

FIG. 22 shows the verification processing of the restoration restriction. Upon receiving the designation of the profile to be applied in the same manner as Embodiment 1 when performing the restoration, whether the configuration of the restoration destination candidate storage apparatus which satisfies the designated profile satisfies the restoration restriction corresponding to the backup to be restored is verified, and the verification result is registered in the restriction verification result management table 91.

The processing of S701 to S704 explained below is performed as loop processing in relation to the restoration destination candidate storage apparatus.

Foremost, the restriction verification unit 86 acquires entries related to the restoration destination storage apparatus from the virtual host configuration table 82, the server configuration table 83, and the topology configuration table 84 (S701). For example, when the restoration destination storage apparatus is "Storage 3", the second entry (entry of the second line) is acquired from the topology configuration table 84, the second entry (entry of the third line) is acquired from the server configuration table 83 based on information in which the physical host related to "Storage 3" is "HV2", and the third entry (entry of the third line) is acquired from the virtual host configuration table 82 based on information in which the virtual host related to "HV2" is "VM3".

Next, the restoration restriction 89 corresponding to the backup to be restored is acquired from the backup history table 74, and whether the entries acquired in S701 satisfy the restoration restriction is verified (S702). For example, upon comparing the entries acquired in the example of S701 and the restoration restriction shown in FIG. 23, while the "minimum value" of the "I/F count" of the "physical host" being "3" (that is, the I/F count of the physical host is 3 or more) is defined as a restriction in the restoration restriction, because the "I/F count" of the physical host "HV2" related to "Storage 3" as the restoration destination storage apparatus is "2" according to the entries acquired in S701, in this case it is determined that the restoration restriction is not satisfied.

When the restoration restriction 89 is satisfied (Yes in S702), the process proceeds to S704. When the restoration restriction 89 is not satisfied (No in S702), the ID related to the device or the device part that caused the non-satisfaction of the restoration restriction is acquired (S703). For example, in the case of the verification result shown as an explanatory example of S702, because the insufficiency of the "I/F count" of "HV2" is the cause, "HV2" is acquired.

Next, the verification result acquired in S702 and the information acquired in S703 are registered in the restriction verification result management table 91 (S704). For example, in the case of the explanatory example of S703, as with the third line of the restriction verification result management table 91 shown in FIG. 25, "Storage 3" is registered in the storage apparatus ID 911, "false" (restriction is not satisfied) is registered in the restriction check 912, "A-1" is registered in the restoration restriction ID 913, and "HV2" is registered in the restriction violating device ID 914.

When the I/O device 34 is instructed to output the storage apparatus that satisfies the profile to be applied to the restoration based on the same processing as Embodiment 1, the I/O device 34 is also instructed to output the information registered in the restriction verification result management table 91 as information indicating the necessity of changing the configuration of the respective storage apparatuses.

By presenting the verification result of the restrictive conditions related to the configuration of the storage apparatus as information for selecting the restoration destination, it is possible to support the user's selection.

Figure 23:
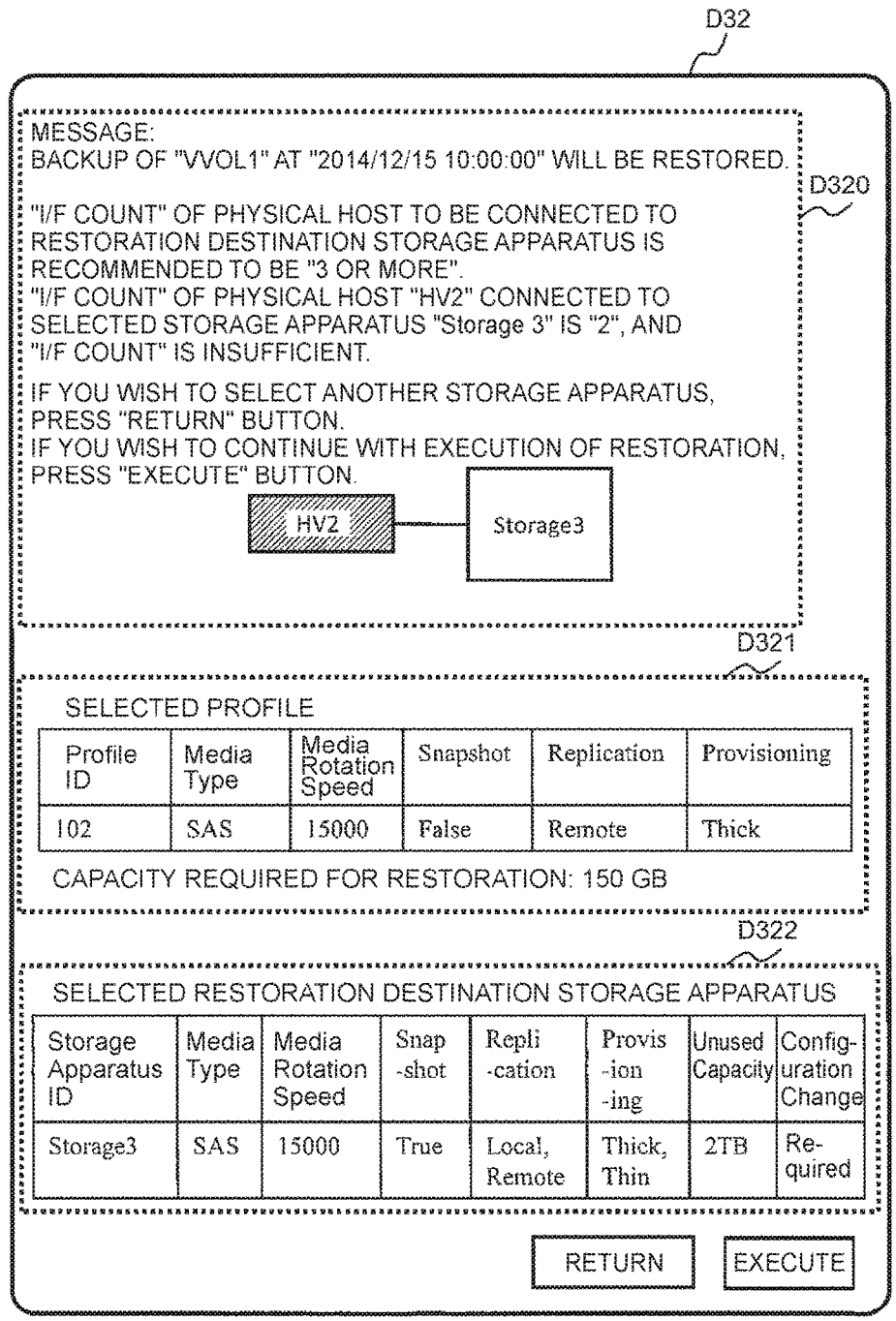
FIG. 23 shows a screen example of a case where a storage apparatus requiring a configuration change is selected as the restoration destination according to the second embodiment.

FIG. 23 shows a configuration example of the screen D32 to be notified to the user for recommending the configuration change related to the restoration destination candidate selected by the user.

This screen is displayed upon receiving the user's selection of the candidate, in which the necessity of a configuration change when performing the restoration has been determined, among the restoration destination candidate storage apparatuses presented by the I/O device 34. When the configuration related to the volume to be backed up when performing the backup and the configuration related to the restoration destination candidate volume are different, because there is a possibility that the mode of usage of the volume required by the application cannot be realized, this is a screen for confirming whether or not restoration can be executed to the designated restoration destination.

This screen includes, for example, a message display part D320, a selected profile display part D321, and a selected restoration destination display part D322.

The message display part D320 displays, for example, information related to the backup for which a restoration request was received, description of the recommended configuration change, operational instructions to the user, and a topology diagram related to the selected storage apparatus.

Information related to the backup in which restoration was requested is acquired from the backup history table 74. Description of the recommended configuration change and the topology diagram are created, for instance, based on the restoration restriction 89 corresponding to the restoration restriction ID stored in the entry of the backup of the backup history table 74, and the entries related to the restoration destination storage apparatus of the topology configuration table 84 and the server configuration table 83. The selected profile display part D321 displays information of the profile to be applied to the restoration for which the user's selection was received.

The selected restoration destination display part D322 displays information of the restoration destination candidate storage apparatus for which the user's selection was received.

According to the foregoing second embodiment, in addition to the control of backup and restoration in the first embodiment, the verification result of the restrictive conditions of the configuration for restoring the backup data is presented together with information for making the selection upon presenting the restoration destination candidate. It is possible to support the selection of an appropriate restoration destination when performing the restoration of backup data, and reduce the operation management cost required for performing the restoration.

Note that the various types of information in the foregoing embodiments were expressed in a "table" format, such information does not necessarily have to be expressed as a data structure in the form of a table, and may also be expressed as a list, a DB (database), a queue or other data structures or other configurations, and may also be simply referred to as "information". Moreover, while expressions such as "name", "ID", and "identifier" were used when explaining the contents of the various types of information, these expressions are mutually replaceable.

REFERENCE SIGNS LIST

1: Host computer, 3: Storage management computer, 4: Backup management computer, 5: Storage apparatus, 6: Backup apparatus

The invention claimed is:
1. A management computer, comprising:
   a memory which communicates with a host computer and a storage apparatus and stores:
   configuration information which indicates, by mapping, a virtual volume recognized by the host computer and a logical volume provided by the storage apparatus; and
   backup history information which stores, by associating, a data backup history with the virtual volume and the logical volume; and
   a CPU which is connected to the memory,
   wherewith, upon receiving a data backup request designating the virtual volume, the CPU:
   refers to the configuration information and acquires information of the logical volume mapped to the designated virtual volume, refers to the backup history information and determines whether the mapped logical volume coincides with the logical volume associated with the stored backup history, and when the mapped logical volume differs from the logical volume associated with the stored backup history as a result of the determination, performs control to implement a differential backup between the logical volumes.

2. The management computer according to claim 1,
wherein the configuration information additionally stores performance requirement information which is set to the virtual volume,
wherein the CPU:
has a function of mapping the virtual volume to the logical volume,
maps the logical volume to the virtual volume based on the performance requirement information, and
changes the mapping of the logical volume to the virtual volume according to a change of the performance requirement information.

3. The management computer according to claim 2,
wherein the virtual volume is assigned to an object which is stored in a storage area of the storage apparatus and executed by the host computer.

4. The management computer according to claim 3,
wherein the object is a virtual machine.

5. The management computer according to claim 1,
wherein, upon receiving a restoration request designating backup data,
the CPU:
refers to the backup history information and determines whether the designated backup data is a differential backup, and
when it is determined that the designated backup data is a differential backup, acquires information of backup data related to the designated backup data from the backup history information, and instructs data restoration based on the acquired information.

6. The management computer according to claim 5,
wherein, upon receiving the restoration request,
the CPU:
refers to the configuration information and determines whether there is a storage apparatus which satisfies a performance requirement regarding the respective performance requirement information stored in the configuration information, and
outputs, as a candidate of the performance requirement to be applied to the virtual volume corresponding to the data to be restored, the performance requirement in which the CPU determined that there is a storage apparatus which satisfies the performance requirement.

7. The management computer according to claim 6,
wherein the memory further stores performance requirement history information which manages a history of the performance requirement being set to the virtual volume, and
wherein the CPU:

refers to the performance requirement history information upon outputting the performance requirement information of the application candidate, and determines whether a history exists in which the performance requirement of the application candidate was set to the virtual volume corresponding to the designated backup data, and outputs a result of the determination of the existence of the history together with the performance requirement information of the application candidate.

8. The management computer according to claim 7,
wherein the CPU:
refers to the configuration information upon performing backup control, generates configuration restriction information related to the designated virtual volume, and associates the generated configuration restriction information with the backup data information and stores the association in the backup history information,
upon receiving a restoration request designating the backup data,
refers to the configuration information and acquires a configuration related to the storage apparatus to become a restoration destination candidate,
refers to the backup history information and acquires the restriction information associated with the designated backup data,
verifies whether the acquired configuration related to the storage apparatus satisfies the restriction information, and
outputs the verification result.

9. The management computer according to claim 8,
wherein the memory additionally stores a template for generating restriction information, and
wherein the CPU generates the restriction information by referring to the configuration information and the template.

10. A management method of a storage apparatus by a management computer,
comprising the steps of:
upon receiving a data backup request designating a virtual volume to be recognized by a host computer,
referring to configuration information which indicates, by mapping, the virtual volume and a logical volume provided by the storage apparatus, and acquiring information of the logical information mapped to the designated virtual volume;
referring to backup history information which stores, by associating, a data backup history with the virtual volume and the logical volume, and determining whether the mapped logical volume coincides with the logical volume associated with the stored backup history; and
when the mapped logical volume differs from the logical volume associated with the stored backup history as a result of the determination, performing control to implement a differential backup between the logical volumes.

* * * * *